United States Patent
Zhang et al.

(10) Patent No.: US 9,268,576 B1
(45) Date of Patent: Feb. 23, 2016

(54) PHYSICAL REPLICA UTILIZING REPLICA VIRTUAL STORAGE FOR COMPUTER SYSTEM

(71) Applicant: CA, Inc., Islandia, NY (US)

(72) Inventors: Haiyang Zhang, Beijing (CN); Shishen Liu, Beijing (CN); Lei Huang, Beijing (CN); Lei Wang, Beijing (CN)

(73) Assignee: CA, INC., Islandia, NY (US)

( * ) Notice: Subject to any disclaimer, the term of this patent is extended or adjusted under 35 U.S.C. 154(b) by 301 days.

(21) Appl. No.: 13/890,060

(22) Filed: May 8, 2013

(51) Int. Cl.
*G06F 9/44* (2006.01)

(52) U.S. Cl.
CPC ............ *G06F 9/4401* (2013.01); *G06F 9/4406* (2013.01); *G06F 9/4416* (2013.01)

(58) Field of Classification Search
CPC .... G06F 9/4406; G06F 9/4416; G06F 9/4401
See application file for complete search history.

(56) References Cited

U.S. PATENT DOCUMENTS

| | | | | |
|---|---|---|---|---|
| 5,404,527 | A | * | 4/1995 | Irwin et al. ..................... 709/222 |
| 5,771,354 | A | * | 6/1998 | Crawford ..................... 709/229 |
| 8,521,950 | B2 | * | 8/2013 | Love ............................ 711/104 |
| 2008/0120403 | A1 | * | 5/2008 | Lowery et al. ................ 709/223 |
| 2011/0252001 | A1 | * | 10/2011 | Bensinger ..................... 707/658 |

* cited by examiner

*Primary Examiner* — Thuan Du
(74) *Attorney, Agent, or Firm* — Gilliam IP PLLC

(57) ABSTRACT

A method includes replicating data stored on storage devices of a physical master computer system to replica virtual storage devices via a network connection, modifying boot configuration data on the replica virtual storage devices to boot a physical replica computer system, and booting the physical replica computer system from the replica virtual storage devices to replace the physical master computer.

20 Claims, 5 Drawing Sheets

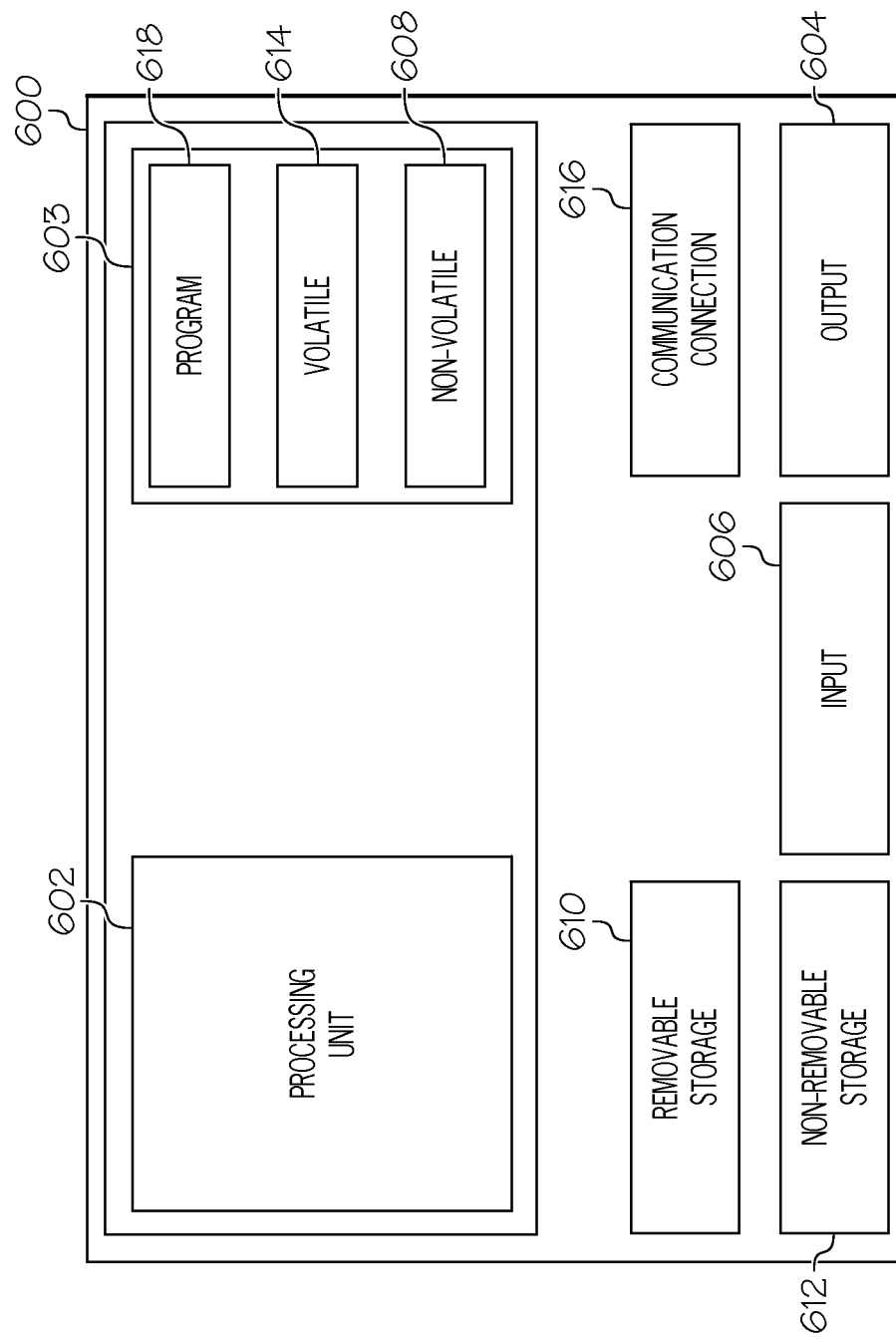

PHYSICAL REPLICA UTILIZING REPLICA VIRTUAL STORAGE FOR COMPUTER SYSTEM

BACKGROUND

In a full system solution, physical or virtual computers running applications are referred to as masters, and are protected by a virtual machine replica inside a virtual machine platform. The virtual machine replica can take over should the master be unavailable. Each volume of data on each master is protected by a virtual hard disk. If a disk drive on the master has two volumes, two virtual disks are created for the replica.

When a master is unavailable, such as via a breakdown, the virtual machine platform will create a virtual machine replica and attach the virtual hard disks to the virtual machine replica. Many virtual machine platforms are limited in the number of virtual disk drives that can be handled. Delay may also be encountered when switching over to the virtual machine replica, as the replica must be created. In addition, virtual platform resources and performance may be burdened with other virtual machines.

BRIEF SUMMARY

A method includes replicating data stored on storage devices of a physical master computer system to replica virtual storage devices via a network connection, modifying boot configuration data on the replica virtual storage devices to boot a physical replica computer system, and booting the physical replica computer system from the replica virtual storage devices to replace the physical master computer.

A system includes a physical replica computer system having multiple storage devices. Replica virtual storage devices are coupled to communicate with the physical replica computer system and to replicate data storage on storage devices of the physical master computer system received via a network connection. A boot configuration data file is stored on the replica virtual storage devices to boot the physical replica computer system to replace the physical master computer.

In a further embodiment, a computer program product includes a computer readable storage medium having computer readable program code embodied therewith. The computer program code includes computer readable program code configured to replicate data stored on storage devices of a physical master computer system to replica virtual storage devices via a network connection, modify boot configuration data on the replica virtual storage devices to boot a physical replica computer system, and boot the physical replica computer system from the replica virtual storage devices to replace the physical master computer.

BRIEF DESCRIPTION OF THE DRAWINGS

Aspects of the present disclosure are illustrated by way of example and are not limited by the accompanying figures with like references indicating like elements.

FIG. 6 is a block diagram of an example computer system according to an example embodiment.

DETAILED DESCRIPTION

Figure 1:
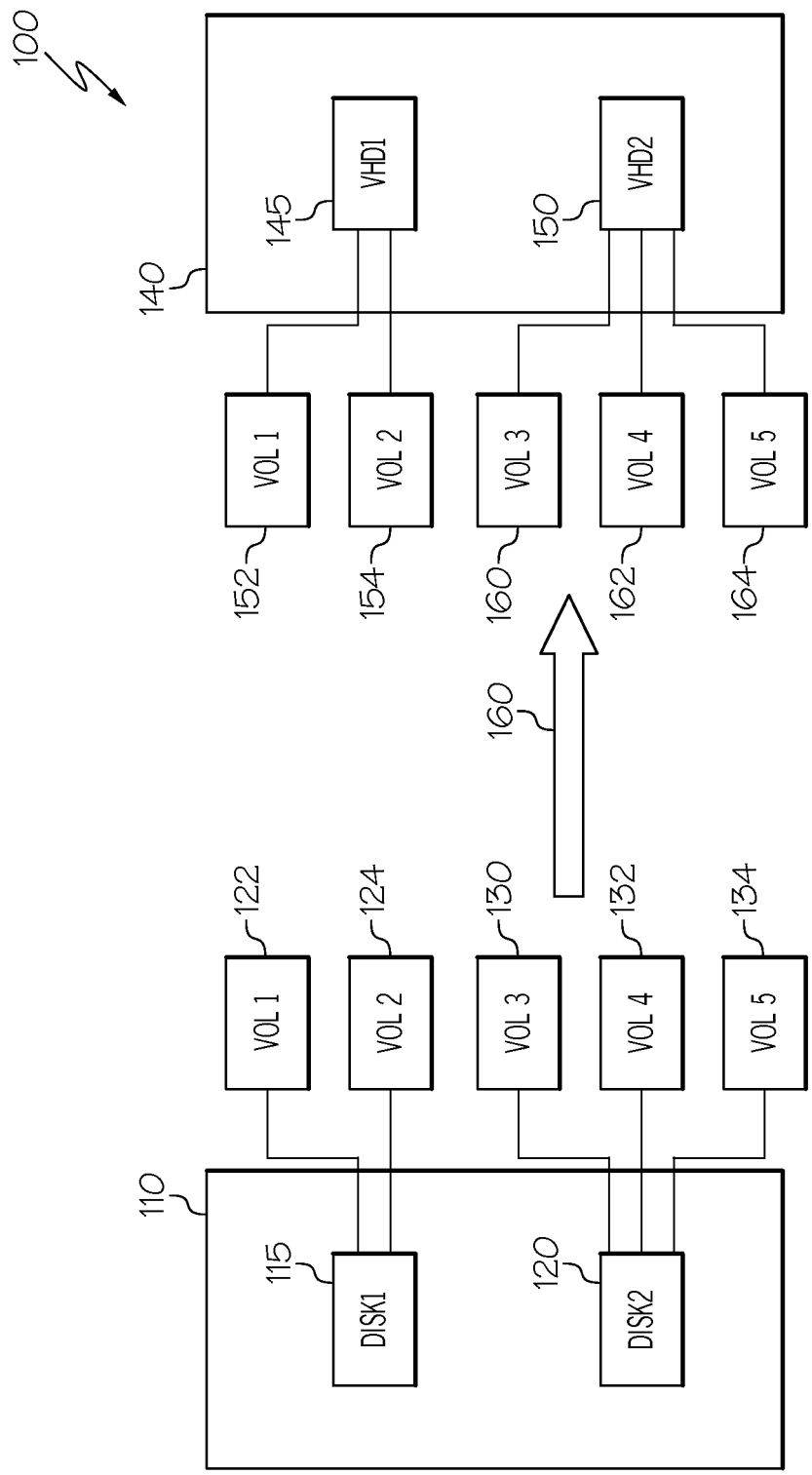
FIG. 1 is a block diagram of a system including a master system and a physical replica system utilizing virtual replica storage devices according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a block diagram of a system 100 that includes a master computer system 110 having multiple storage devices, such as disk drives 115 and 120. Each storage device may contain multiple volumes as indicated at 122 and 124 for storage device 115, and at 130, 132, and 134 for storage device 120. Master computer system 110 may be a physical computer system or a virtual machine in various embodiments. Master computer system 110 is an active system, running one or more applications and interacting with one or more users in some embodiments.

As system 110 operates, it may make changes to data stored on the storage devices 115 and 120. A replica physical machine 140 is used in one embodiment as a standby system in case of degraded performance or failure of the system 110 that requires maintenance or replacement. Since system 110 may be providing functions in a real time environment to multiple users, it may be desired to quickly bring a replacement system on line quickly, such as in a transaction based application or other application where down time can be expensive.

In one embodiment, virtual storage devices, such as hard drives 145 and 150 are created to replicate data from corresponding storage devices 110 and 120. The replica storage devices may also include the same volume structure as indicated at volumes 152, 154 for replica storage device 145 and at volumes 160, 162, and 164 for replica storage device 150. In one embodiment, the virtual storage devices 145 and 150 have the same size as the storage devices on the master system 110 and the same partitions of data. The data from the storage devices on the master system are replicated via a network connection 160 onto the replica storage devices. The volumes are synchronized and changes are captured on the replica storage devices, such that the replica storage devices have the same data and data structure as the master storage devices.

Figure 2:
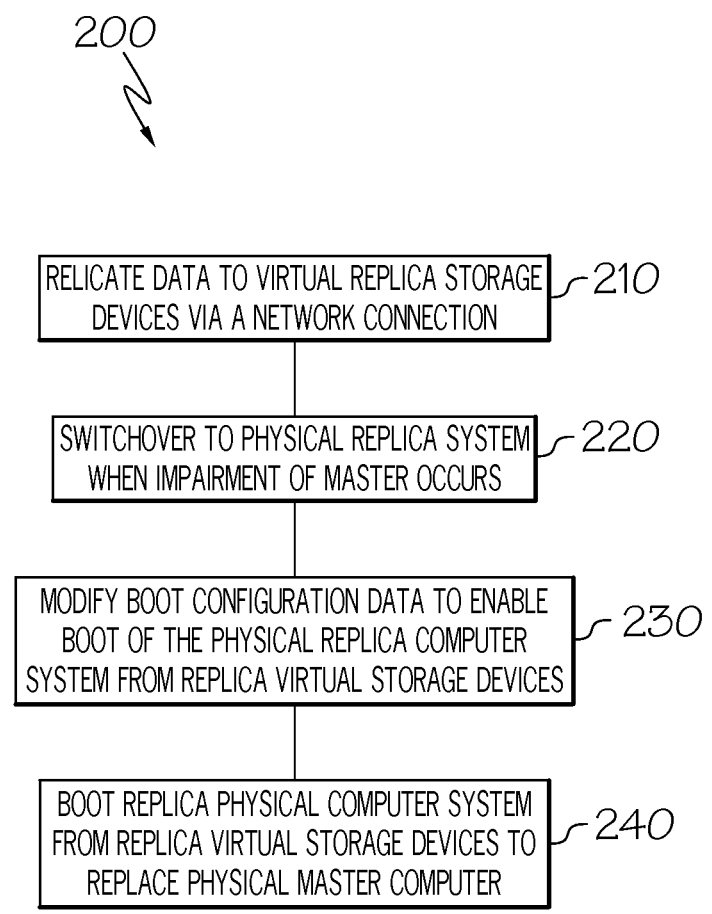
FIG. 2 is a flowchart illustrating a method of switchover to a replica computer system according to an example embodiment.

A method 200 for replicating data and switching over the active role to the replica system 140 is illustrated in flowchart form in FIG. 2. During normal operation of the master system 110, data stored on storage devices of the physical master computer system is replicated at 210 to replica virtual storage devices via a network connection. When the master system becomes impaired, a switchover to the replica system is initiated at 220. The impairment may be a degraded performance or a complete failure that may be detected in many different common ways. Scheduled maintenance may also constitute impairment in some embodiments. When switchover is initiated, boot configuration data on the replica virtual storage devices is modified at 230 to enable boot of the physical replica computer system. At 240, the physical replica computer system is booted from the replica virtual storage devices to replace the physical master computer.

In various embodiments, as all the data from the master storage devices is stored in the replica virtual storage devices, when master is down, the replica machine is started from the replica virtual storage devices, and the replica system takes the master role.

Figure 3:
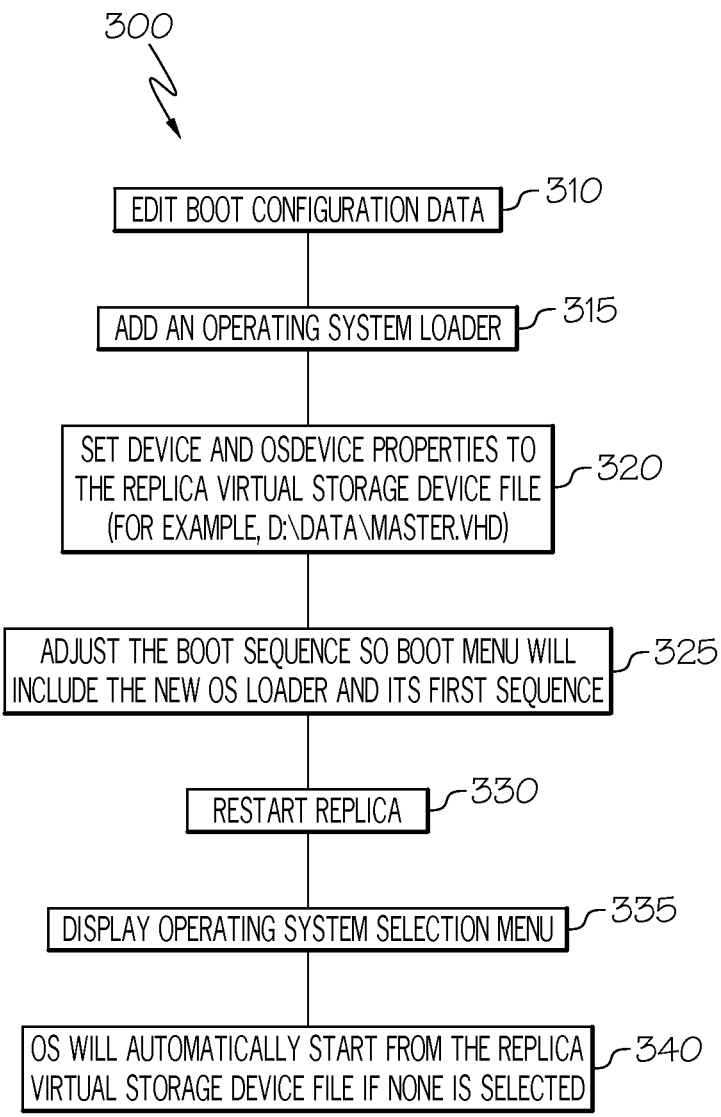
FIG. 3 is a flowchart illustrating a method of booting from a replica computer system according to an example embodiment.

FIG. 3 illustrates a method 300 in flowchart form. In order to support boot the system from the virtual storage device files, the boot configuration data (BCD) is edited on the replica system starting at 310, by adding one operating (OS) loader to the BCD at 315, setting device and OSdevice properties to the replica virtual storage device file (for example, D:\data\master.vhd) at 320, and adjusting the boot sequence at 325. So the boot menu will include the new OS loader and its first sequence. The replica is restarted at 330. In one embodiment, a menu identifying one or more operating systems may be displayed at 335 allowing a user to select the operating system to install. As the new OS loader is the first sequence, the OS will automatically start at 340 from the replica virtual storage device file if none is selected.

After the replica system has started, the data may be changed by the system itself such as by executing an application. Further, a may change some data to perform testing. Thus, data change is likely unavoidable. This makes assurance testing following switchover challenging. In one embodiment, to assure data integrity after the testing, the original data is kept in the replica virtual storage device files. Further, replication continues while performing assurance recovery testing. It is also challenging to ensure that all the changes are properly applied to the replica virtual storage devices during assurance recovery testing.

Figure 4:
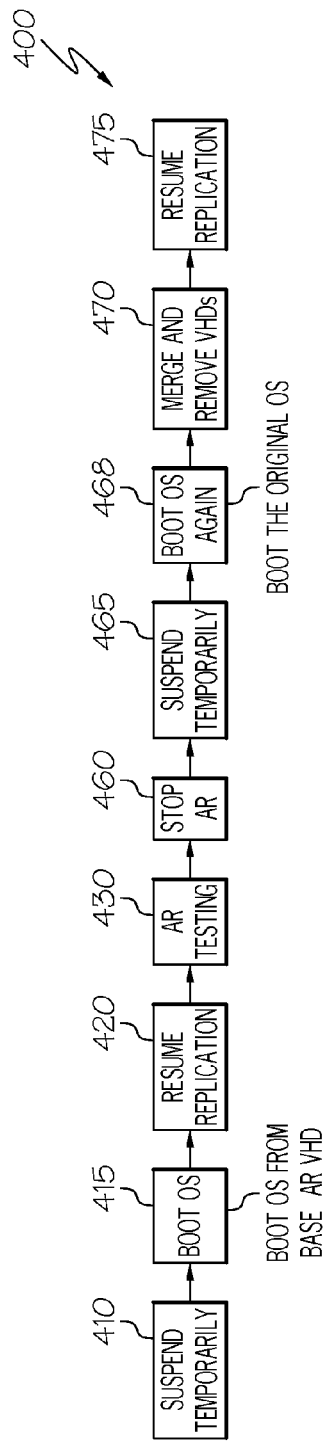
FIG. 4 is a flow diagram illustrating a method of assurance testing a replica computer system according to an example embodiment.

FIG. 4 is a flowchart of a method 400 of performing assurance recovery testing. At 410, replication is temporarily suspended. Changes are stored on the master storage devices as the replica reboots at 415. The changes will not be sent to replica before the replica is restarted. Two differencing replica virtual storage (also referred to as VHD—virtual hard drive or disk) files are created from the base replica virtual storage file on the replica storage devices. One differencing file may be named base_AR.vhd. This file is for assurance and recovery (AR) testing. Another replica virtual storage file is named base_rep.vhd, and is for replication.

The boot configuration data is changed by adding a new OS loader to the BCD. The new OS loader points to the base_AR.vhd file, and adjusts the boot sequence to cause the replica system to automatically start from the base_AR.vhd file. After the base_AR.vhd has booted and started, the base_rep.vhd file is attached at 420 to the replica system, and replication is resumed. The changes will apply to the base_rep.vhd file during the AR testing period at 430, but all the test data will be written into base_ar.vhd file. In this manner, AR testing will not affect the replication.

During AR testing, the user may test the system and may accept some changes resulting from the AR testing. The replica system may then be booted again from the replica virtual storage devices to restart to the original system and the AR testing is stopped at 460. During a starting phase, the replication is temporarily suspended again at 465. After the replica system started has booted again at 468, the base_AR.vhd file is deleted, and the base_rep.vhd file is merged into the base replica virtual storage file at 470, so all the changes during the AR testing period will be merged into the base replica virtual storage file. The base_rep.vhd file will also be deleted. The replication is then resumed at 475.

Figure 5:
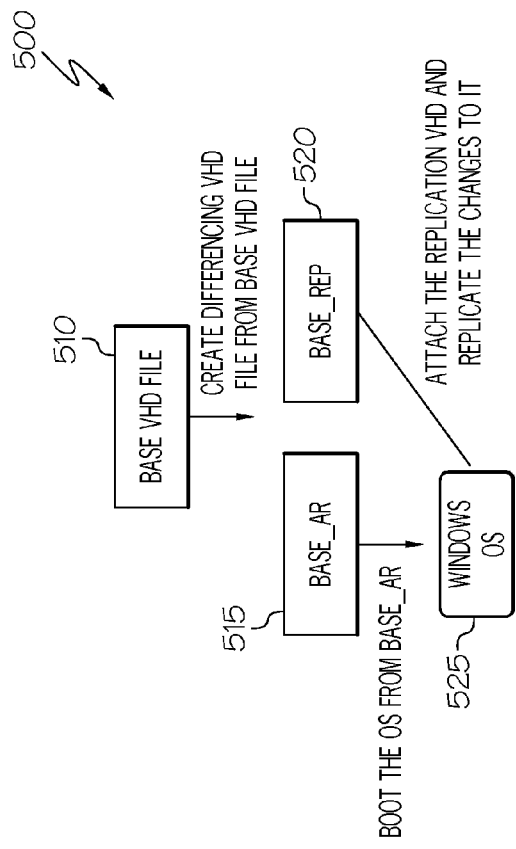
FIG. 5 is a block flow diagram illustrating differencing files created during assurance testing of a replica computer system according to an example embodiment.

FIG. 5 is a block flow diagram illustrating at 500, creation of intermediate files for assurance recovery testing and tracking of data changes during the AR testing. As indicated above, the base replica virtual storage file, referred to as a base VHD file 510 is used to create two differencing replica VHD files. One differencing file may be named base_AR.vhd 515. This file is for assurance and recovery (AR) testing. Another replica virtual storage file is named base_rep.vhd 520, and is for replication. The operating system, Windows® OS at 525 in one embodiment, is booted from the base_AR file 515, while the base_rep file 520 is attached and used to replicate the changes that occurred during AR testing.

FIG. 6 is a block schematic diagram of a computer system 600 to implement one or more components, such as the replica system according to an example embodiment. Such computer system 600 may also be used to implement virtual platforms. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 600, may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
replicating data stored on a storage device of a physical master computer system to a replica virtual storage device via a connection;
modifying boot configuration data on the replica virtual storage device to boot a physical replica computer system;
booting the physical replica computer system from the replica virtual storage device; and
after booting of the physical replica computer system, performing assurance recovery testing, wherein performing assurance recovery testing comprises:
temporarily suspending replicating of data changes;
storing the data changes on a storage device of the physical master computer system while replicating is suspended;
creating a testing differencing virtual storage file and a replication differencing virtual storage file from a base replica virtual storage file on the replica virtual storage device;
modifying the boot configuration data to point to the testing differencing virtual storage file; and
adjusting a boot sequence to start from the testing differencing virtual storage file.

2. The method of claim 1, wherein replicating data comprises creating a replica virtual storage device for each storage volume on the storage device of the physical master computer system.

3. The method of claim 2, wherein replicating data further comprises:
attaching replica virtual storage devices to the physical master computer system; and
creating partitions for the replica virtual storage devices according to volume information on the physical master computer system.

4. The method of claim 1, wherein replicating data comprises capturing data changes to the storage device of the physical master computer system and replicating the data changes to the replica virtual storage device.

5. The method of claim 1, wherein modifying the boot configuration data further comprises:
adding an operating system loader to a boot selection menu;
setting device properties to the replica virtual storage devices; and
adjusting a boot sequence.

6. The method of claim 1, further comprising continuing to replicate data changes during assurance recovery testing.

7. The method of claim 1, wherein performing assurance recovery testing further comprises:
booting from the testing differencing virtual storage file; and
attaching the replication differencing virtual storage file.

8. The method of claim 7, further comprising resuming replication following attaching the replication differencing virtual storage file.

9. The method of claim 8, further comprising:
accepting changes resulting from the assurance recovery testing;
rebooting the physical replica computer system from the replica virtual storage device;
following rebooting, deleting the testing differencing virtual storage file; and
merging the replication differencing virtual storage file into the base replica virtual storage file.

10. A computer program product comprising a non-transitory computer readable storage medium having instructions stored therein, which when executed by a processor, cause the processor to perform operations comprising:
replicating data stored on a storage device of a physical master computer system to a replica virtual storage device via a connection;
modifying boot configuration data on the replica virtual storage device to boot a physical replica computer system;
booting the physical replica computer system from the replica virtual storage device; and
after booting of the physical replica computer system, performing assurance recovery testing, wherein performing assurance recovery testing comprises:
temporarily suspending replicating of data changes;
storing the data changes on a storage device of the physical master computer system while replicating is suspended;
creating a testing differencing virtual storage file and a replication differencing virtual storage file from a base replica virtual storage file on the replica virtual storage device;
modifying the boot configuration data to point to the testing differencing virtual storage file; and
adjusting a boot sequence to start from the testing differencing virtual storage file.

11. The computer program product of claim 10, wherein the instructions further comprise instructions, which when executed by the processor, cause the processor to perform operations comprising
creating a replica virtual storage device for each storage volume on the storage device of the physical master computer system.

12. The computer program product of claim 10, wherein the instructions further comprise instructions, which when executed by the processor, cause the processor to perform operations comprising:
booting from the testing differencing virtual storage file; and
attaching the replication differencing virtual storage file.

13. The computer program product of claim 11, wherein the instructions further comprise instructions, which when executed by the processor, cause the processor to perform operations comprising:
attaching replica virtual storage devices to the physical master computer system; and
creating partitions for the replica virtual storage devices according to volume information on the physical master computer system.

14. The computer program product of claim 12, wherein the instructions further comprise instructions, which when executed by the processor, cause the processor to perform operations comprising:
accepting changes resulting from the assurance recovery testing;
rebooting the physical replica computer system from the replica virtual storage device;
following rebooting, deleting the testing differencing virtual storage file; and
merging the replication differencing virtual storage file into the base replica virtual storage file.

15. A system comprising:
a processor; and
a machine readable storage medium having program code stored therein that is executable by the processor to cause the processor to,
  replicate data stored on a storage device of a physical master computer system to a replica virtual storage device via a connection;
  modify boot configuration data on the replica virtual storage device to boot a physical replica computer system;
  boot the physical replica computer system from the replica virtual storage device; and
  after booting of the physical replica computer system, performing assurance recovery testing, wherein performing assurance recovery testing comprises:
    temporarily suspending replicating of data changes;
    storing the data changes on a storage device of the physical master computer system while replicating is suspended;
    creating a testing differencing virtual storage file and a replication differencing virtual storage file from a base replica virtual storage file on the replica virtual storage device;
    modifying the boot configuration data to point to the testing differencing virtual storage file; and
    adjusting a boot sequence to start from the testing differencing virtual storage file.

16. The system of claim 15, wherein the program code further comprises program code that is executable by the processor to cause the processor to create a replica virtual storage device for each storage volume on the storage device of the physical master computer system.

17. The system of claim 16, wherein the program code further comprises program code that is executable by the processor to cause the processor to:
  attach replica virtual storage devices to the physical master computer system; and
  create partitions for the replica virtual storage devices according to volume information on the physical master computer system.

18. The system of claim 15, wherein the program code further comprises program code that is executable by the processor to cause the processor to:
  boot from the testing differencing virtual storage file; and
  attach the replication differencing virtual storage file.

19. The system of claim 18, wherein the program code further comprises program code that is executable by the processor to cause the processor to resume replication following attaching the replication differencing virtual storage file.

20. The system of claim 19, wherein the program code further comprises program code that is executable by the processor to cause the processor to:
  accept changes resulting from the assurance recovery testing;
  reboot the physical replica computer system from the replica virtual storage device;
  following rebooting, delete the testing differencing virtual storage file; and
  merge the replication differencing virtual storage file into the base replica virtual storage file.

* * * * *